Patented Aug. 25, 1936

2,052,286

UNITED STATES PATENT OFFICE 2,052,286

MANUFACTURE OF LAMINATED GLASS

Robert H. Du Bois, Jeannette, Pa., assignor to American Window Glass Company, Pittsburgh, Pa., a corporation of Pennsylvania No Drawing. Application April 26, 1933, Serial No. 668,082

10 Claims. (Cl. 49—81)

My invention relates to the manufacture of laminated glass and provides an improved method of manufacturing the same.

Heretofore, laminated or strengthened glass has been manufactured by numerous processes and by the use of various materials as the strengthening medium to be interposed between the glass sheets and rigidly united thereto. The products heretofore manufactured by the known processes and by the use of the various materials have been objectionable in many respects. Many of the defects resulting from the presently known processes are pointed out in the copending application of Frederic L. Bishop and Charles S. Shoemaker, Serial No. 658,598, filed February 25, 1933.

In the aforesaid copending application, there is shown and described a new and useful method of manufacturing laminated glass and the products resulting therefrom, and which are far superior to any of the heretofore known methods of manufacture or products. The present invention, generally speaking, relates to the improved method of manufacturing set forth in said application.

By my invention I provide a method of manufacture wherein the glass sheets to be formed into a sandwich with a strengthening material are initially treated with an agent which is a plasticizing agent for the strengthening material. In carrying out my invention, it is unnecessary to treat both of the glass sheets with the plasticizing agent for the strengthening material before the sandwich is formed, as highly advantageous results can be obtained by merely treating one of the glass sheets of the sandwich. My invention is particularly advantageous for use in conjunction with a method for manufacture wherein the strengthening material is in liquid form and is flowed on a glass sheet or on both of the glass sheets to be formed into the sandwich.

In order to more fully describe my invention, I will proceed with a description of the presently preferred method of practicing the same. It will be understood, however, that I do not intend to be limited to this particular method of manufacture, but that my invention may be otherwise practiced as hereinafter more fully pointed out.

In carrying out my preferred process, one surface of each of two glass sheets to be united is initially mechanically or chemically cleaned. Thereafter the cleaned surfaces are treated with an agent which is a plasticizing agent for the strengthening material to be interposed between the two glass sheets. The plasticizing agent used may be a complete solvent for the strengthening material, or may have merely a slight solvent action on it. In carrying out my preferred process wherein the strengthening medium is an acrylic acid ester, I prefer to use dibutyl phthalate as the plasticizing agent for treating the surfaces of the glass sheets. It will be understood that any other plasticizing agent or solvent for the particular strengthening material used may be used as the agent for treating the sheets. Examples of additional agents which may be used where the strengthening medium is an ester of acrylic acid are diethyl chloride and toluol.

The plasticizing agent to be used in treating the glass sheets should have a higher boiling point and/or a lower solidifying point than the strengthening material to be used. This is particularly true where the strengthening material is to be flowed on the surfaces of the glass sheets to be united.

The treating of the glass sheets may be effected by forming a thin film thereof on one surface of each of the glass sheets. This film may be formed in any desired manner.

After the film of the plasticizing agent has been formed on the glass sheets, a liquid strengthening material, such as a solution of an acrylic acid ester, may be flowed thereon. After the strengthening solution has been flowed on the glass sheets in any desired manner, it is dried and the two sheets so treated and coated united with the strengthening material therebetween. The union between the two so coated and dried glass sheets may be effected by very slight pressure or by pressure in the presence of heat.

It will be understood, of course, that only one of the glass sheets to be united need be treated and coated in the above manner and an uncoated sheet united thereto.

The flowing of the strengthening material on the treated glass sheets, the drying, and the uniting of the glass sheets may be performed in various ways. A number of such modifications are set forth in the aforesaid Bishop and Shoemaker application, and reference is hereby made to said application for a fuller discussion of such modifications.

Where sufficient of the plasticizing agent is used to treat the glass sheets and a liquid strengthening material is flowed thereover, the plasticizing agent will rise up through the liquid strengthening material during the drying thereof, and very materially aid in the elimination of bubbles from the solution. Where the strengthening material is in the form of sheets, the plasticizing agent on the sheets of glass materially aids in effecting a proper union between the strengthening medium and the glass sheets, and in view of the characteristics above set forth, it will remain in the composite product and aid in the retention of the strengthening medium in a non-brittle state.

While I have described my preferred method of manufacture and several modifications thereof, it will be understood that I do not intend to be limited thereby, but that my invention may be otherwise practiced within the scope of the appended claims.

I claim:

1. In the manufacture of laminated glass, the steps comprising treating a glass sheet with a plasticizing agent, flowing a layer of liquid strengthening material on said glass sheet, said plasticizing agent being a plasticizer for the strengthening material, drying the strengthening material, and uniting the coated glass sheet to a second glass sheet with the strengthening layer therebetween.

2. In the manufacture of laminated glass, the steps comprising treating a glass sheet with a plasticizing agent, flowing a layer of liquid strengthening material on said glass sheet, said plasticizing agent being a plasticizer for the strengthening material, drying the strengthening material, and uniting the coated glass sheet to a second similarly treated glass sheet with the strengthening layer therebetween.

3. In the manufacture of laminated glass, the steps comprising forming a film of a plasticizing agent on a glass sheet, flowing a layer of a liquid strengthening material on said glass sheet, said plasticizing agent being a plasticizer for the strengthening material, drying the strengthening material, and uniting the coated glass sheet to a second glass sheet with the strengthening layer therebetween.

4. In the manufacture of laminated glass, the steps comprising forming a film of a plasticizing agent on a glass sheet, flowing a layer of a liquid strengthening material on said glass sheet, said plasticizing agent being a plasticizer for the strengthening material and having a higher boiling point than the liquid strengthening material, drying the strengthening material, and uniting the coated glass sheet to a second glass sheet with the strengthening layer therebetween.

5. In the manufacture of laminated glass, the steps comprising forming a film of a plasticizing agent on a glass sheet, flowing a layer of a liquid strengthening material on said glass sheet, said plasticizing agent being a plasticizer for the strengthening material and having a lower solidifying point than the strengthening material, drying the strengthening material, and uniting the coated glass sheet to a second glass sheet with the strengthening layer therebetween.

6. In the manufacture of laminated glass, the steps comprising forming a film of a plasticizing agent on a glass sheet, flowing a layer of a liquid strengthening material on said glass sheet, said plasticizing agent being a plasticizer for the strengthening material and having a higher boiling point and a lower solidifying point than the strengthening material, drying the strengthening material, and uniting the coated glass sheet to a second glass sheet with the strengthening layer therebetween.

7. In the manufacture of laminated glass, the steps comprising forming a film of a plasticizing agent on a glass sheet, flowing a layer of a strengthening material on said glass sheet, said plasticizing agent being a plasticizer for the strengthening material, drying the strengthening material, and uniting the coated glass sheet to a second similarly treated and coated glass sheet with the strengthening material therebetween.

8. In the manufacture of laminated glass, the steps comprising treating one surface of each of two glass sheets with a plasticizing agent, flowing a layer of a strengthening material on said treated surfaces, said plasticizing agent being a plasticizer for the strengthening material and having a higher boiling point than the strengthening material, drying the strengthening material, and uniting the coated glass sheets with the strengthening material therebetween.

9. In the manufacture of laminated glass, the steps comprising treating one surface of each of two glass sheets with a plasticizing agent, flowing a layer of a strengthening material on the treated surfaces of said glass sheets, said plasticizing agent being a plasticizer for the strengthening material and having a lower solidifying point than the strengthening material, drying the strengthening material, and uniting the coated glass sheets with the strengthening layer therebetween.

10. In the manufacture of laminated glass, the steps comprising treating one surface of each of two glass sheets with a plasticizing agent, flowing a layer of a strengthening material on said treated surfaces, said plasticizing agent being a plasticizer for the strengthening material and having a higher boiling point and a lower solidifying point than the strengthening material, drying the strengthening material on said sheets, and uniting the coated sheets with the strengthening layer therebetween.

ROBERT H. DU BOIS.